United States Patent
Takeo (10) Patent No.: US 11,041,499 B2
(45) Date of Patent: Jun. 22, 2021

(54) AIR CONDITIONER

(71) Applicant: DENSO CORPORATION, Kariya (JP)

(72) Inventor: Tomohiro Takeo, Kariya (JP)

(73) Assignee: DENSO CORPORATION, Kariya (JP)

( * ) Notice: Subject to any disclaimer, the term of this patent is extended or adjusted under 35 U.S.C. 154(b) by 48 days.

(21) Appl. No.: 16/432,219

(22) Filed: Jun. 5, 2019

(65) Prior Publication Data

US 2019/0283526 A1    Sep. 19, 2019

Related U.S. Application Data

(63) Continuation of application No. PCT/JP2017/023398, filed on Jun. 26, 2017.

(30) Foreign Application Priority Data

Dec. 27, 2016 (JP) .............................. JP2016-253527

(51) Int. Cl.
*B60H 1/00* (2006.01)
*F04D 25/08* (2006.01)
*F04D 29/42* (2006.01)

(52) U.S. Cl.
CPC ....... *F04D 25/082* (2013.01); *B60H 1/00021* (2013.01); *B60H 1/00471* (2013.01); *F04D 29/42* (2013.01); *B60H 2001/00092* (2013.01)

(58) Field of Classification Search
CPC ............ B60H 1/00021; B60H 1/00471; B60H 2001/00092; B60H 2001/00614; F04D 29/42; F04D 25/08; F04D 25/082
See application file for complete search history.

(56) References Cited

U.S. PATENT DOCUMENTS

| | | | | |
|---|---|---|---|---|
| 6,333,576 B1* | 12/2001 | Ishikawa | ................ | H02K 1/187 310/67 R |
| 6,802,699 B2* | 10/2004 | Mikami | .............. | F04D 29/4226 310/62 |
| 6,831,435 B2* | 12/2004 | Suzuki | ..................... | H02K 5/20 310/58 |
| 7,132,772 B2* | 11/2006 | Takeuchi | ................ | H02K 5/10 310/88 |
| 7,699,587 B2* | 4/2010 | Chapman | ........... | B60H 1/00471 417/370 |
| 10,330,103 B2* | 6/2019 | Wolf | ................... | F04D 25/0606 |
| 2003/0210981 A1* | 11/2003 | Kim | ..................... | F04D 29/626 415/182.1 |

(Continued)

FOREIGN PATENT DOCUMENTS

JP         2009002208 A      1/2009

*Primary Examiner* — Devon Russell
(74) *Attorney, Agent, or Firm* — Harness, Dickey & Pierce, P.L.C.

(57) ABSTRACT

An air conditioner for a vehicle includes: an air conditioning case, a fan, a motor, a cooling passage, a first rib and a second rib. The air conditioning case has an air passage through which air flows. The cooling passage supplies air to the motor from an opening provided in the air passage. The first rib is provided on an inner wall of the air passage upstream of the opening in a flow direction of air. The second rib is provided on the inner wall of the air passage upstream of the first rib in the flow direction of air. A stagnation space is defined between the first rib and the second rib where the air flowing through the air passage stagnates.

13 Claims, 8 Drawing Sheets

(56) References Cited

U.S. PATENT DOCUMENTS

| | | | |
|---|---|---|---|
| 2004/0263009 A1* | 12/2004 | Noda | H02K 5/225 310/71 |
| 2006/0177322 A1* | 8/2006 | Lipa, III | F04D 25/0606 417/423.1 |
| 2006/0181247 A1* | 8/2006 | Marukawa | H01M 10/613 320/150 |
| 2007/0147995 A1* | 6/2007 | Araki | F04D 25/082 415/204 |
| 2007/0237626 A1* | 10/2007 | Pouysegur | F04D 29/584 415/144 |
| 2008/0317586 A1* | 12/2008 | Kuma | F04D 25/082 415/119 |
| 2013/0156554 A1* | 6/2013 | Thawani | B60H 1/00521 415/178 |
| 2017/0051750 A1* | 2/2017 | Handwerk | F04D 25/06 |

\* cited by examiner

AIR CONDITIONER

CROSS REFERENCE TO RELATED APPLICATIONS

The present application is a continuation application of International Patent Application No. PCT/JP2017/023398 filed on Jun. 26, 2017, which designated the United States and claims the benefit of priority from Japanese Patent Application No. 2016-253527 filed on Dec. 27, 2016. The entire disclosures of all of the above applications are incorporated herein by reference.

TECHNICAL FIELD

The present disclosure relates to an air conditioner.

BACKGROUND

An air conditioner mounted on a vehicle performs air-conditioning for a cabin of the vehicle. The air conditioner adjusts the temperature and humidity of air taken into an air passage inside the air conditioning case from outside or inside of the vehicle, and blows the conditioned air into the cabin.

SUMMARY

An air conditioner for a vehicle includes:

an air conditioning case including an air passage through which air flows;

a fan configured to produce an air flow in the air conditioning case;

a motor configured to rotate the fan;

a cooling passage to supply air to the motor from an opening provided in the air passage;

a first rib provided on an inner wall of the air passage and located upstream of the opening in a flow direction of air; and a second rib provided on the inner wall of the air passage and located upstream of the first rib in the flow direction of air.

A stagnation space is defined between the first rib and the second rib where the air flowing through the air passage stagnates.

DETAILED DESCRIPTION

Embodiments according to the present disclosure are hereinafter described with reference to the drawings. Same or equivalent portions among respective embodiments below are labeled with same reference numerals.

First Embodiment

A first embodiment will be described with reference to the drawings. An air conditioner of the present embodiment is mounted on a vehicle, and is disposed inside an instrument panel at the foremost part of the vehicle cabin. The air conditioner sucks one or both of outside air and inside air of the vehicle cabin, and adjusts the temperature and humidity of the sucked air to blow into the vehicle cabin.

Figure 1:
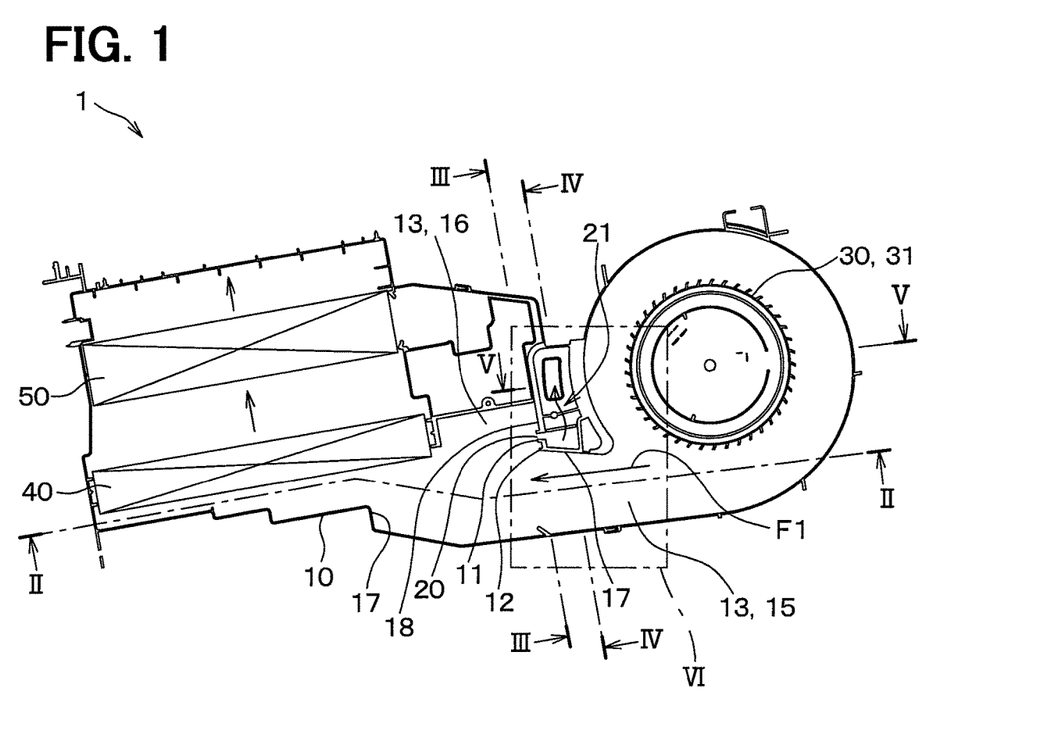
FIG. 1 is a diagram showing an air conditioner according to a first embodiment.
Figure 2:
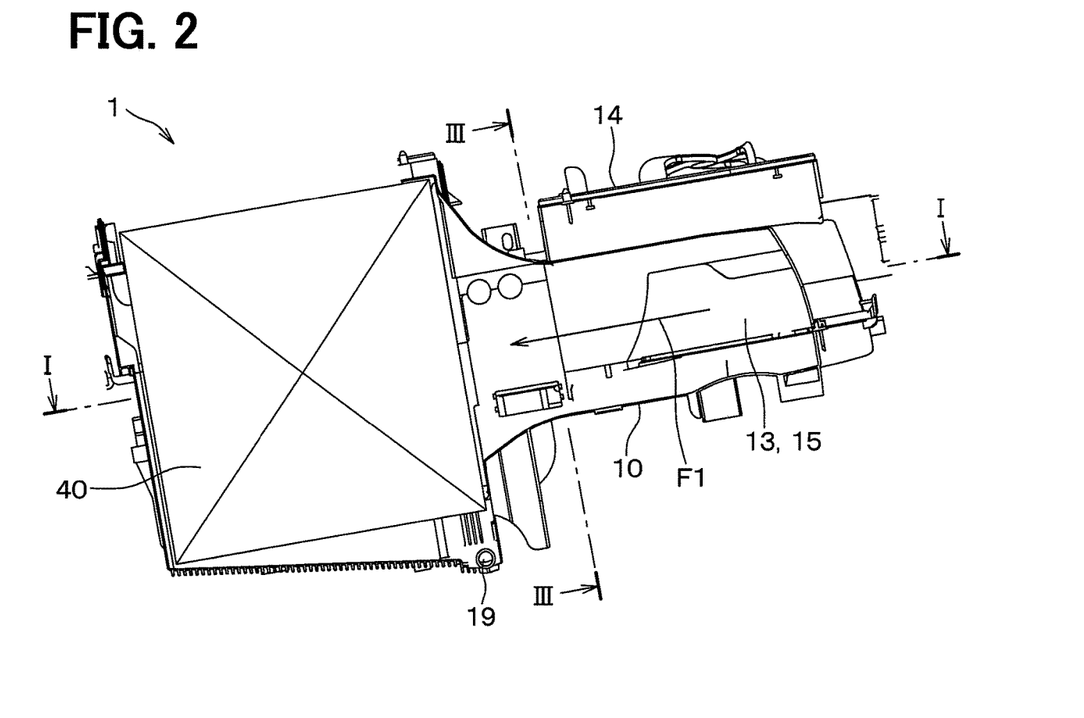
FIG. 2 is a sectional view taken along a line II-II in FIG. 1.

As shown in FIGS. 1 and 2, the air conditioner 1 includes an air conditioning case 10, a first rib 11, a second rib 12, a blower 30, an evaporator 40, a heater core 50, and the like.

The air conditioning case 10 is made of resin having a certain elasticity and excellent in strength. The resin forming the air conditioning case 10 may be polypropylene. The air conditioning case 10 includes an air passage 13 through which air flows. The air conditioning case 10 includes an outside air inlet 14 for introducing outside air into the air passage 13 from the outside of the vehicle, and an inside air inlet (not shown) for introducing inside air into the air passage 13 from a predetermined location in the vehicle cabin. A duct (not shown) configured as a separate member from the air conditioning case 10 may be connected to the outside air inlet 14 or the inside air inlet. In that case, air is introduced into the air passage 13 from the outside air inlet 14 or the inside air inlet via the duct. The ratio of the volume of the outside air introduced into the air passage 13 from the outside air inlet 14 and the volume of the inside air introduced into the air passage 13 from the inside air inlet is adjusted by an inside/outside air switching door (not shown). Outside air introduced from the outside air inlet 14 and inside air introduced from the inside air inlet flow through the air passage 13.

The air passage 13 formed in the air conditioning case 10 includes a main air passage 15 through which air flows from the outside air inlet 14 or the inside air inlet toward the evaporator 40, and a chamber 16 located on a side of the main air passage 15 in a direction intersecting the flow direction of air. In FIGS. 1 and 2, an arrow F1 represents the flow direction of air in the main air passage 15 from the outside air inlet 14 or the inside air inlet toward the evaporator 40. In the following description, an inner wall of the air passage 13 of the air conditioning case 10 has a main inner wall 17 forming the main air passage 15, and a chamber inner wall 18 forming the chamber 16.

The air conditioner 1 of the present embodiment has an opening 20 defined in the inner wall of the air passage 13. In the present embodiment, the opening 20 is provided in the chamber inner wall 18 of the air passage 13. Further, a cooling air introduction portion 21 is provided inside the air conditioning case 10. The cooling air introduction portion 21 is in communication with the air passage 13 via the opening 20. Therefore, a part of the air flowing through the air passage 13 flows into the cooling air introduction portion 21 from the opening 20. The cooling air introduction portion 21 will be described later.

The first rib 11 and the second rib 12 are provided on the inner wall of the air passage 13. In the present embodiment, the first rib 11 and the second rib 12 are provided on the chamber inner wall 18 of the air passage 13. Specifically, the first rib 11 is provided in a portion of the inner wall forming the air passage 13 on the upstream side of the opening 20 in the air flow direction, and is closer to the outside air inlet 14 than the opening 20 is. The second rib 12 is provided in a portion of the inner wall forming the air passage 13 on the upstream side of the first rib 11 in the air flow direction, and is closer to the outside air inlet 14 than the first rib 11 is. The first rib 11 and the second rib 12 are provided side by side in the air flow direction of the air passage 13.

Figure 3:
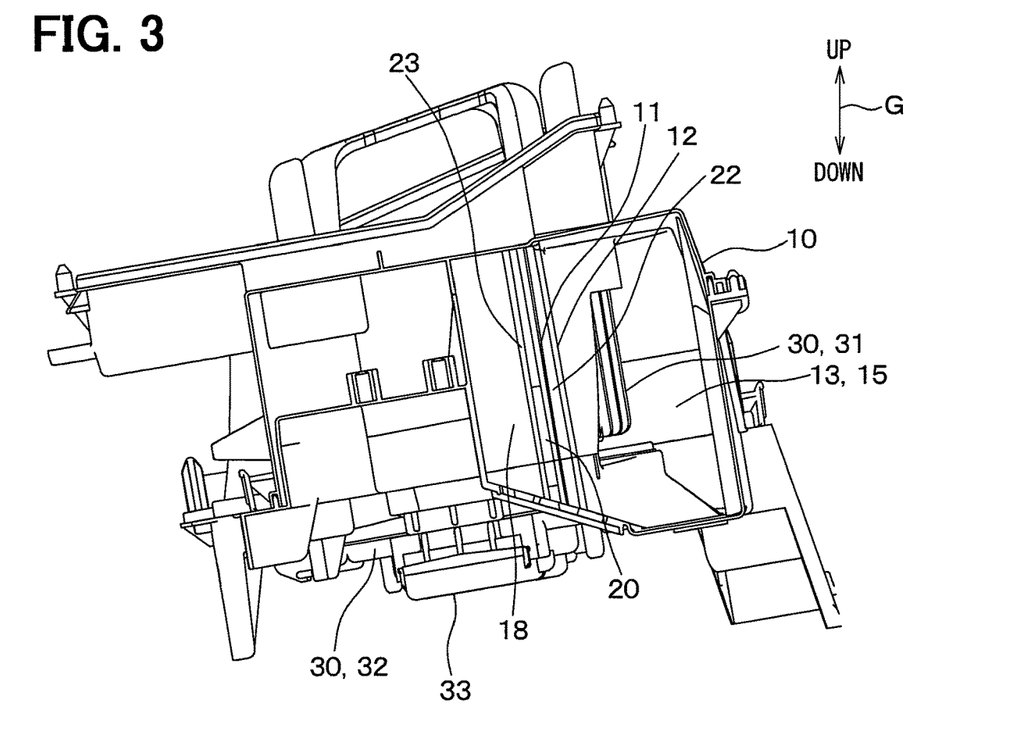
FIG. 3 is a sectional view taken along a line III-III in FIG. 1.

As shown in FIG. 3, the first rib 11 and the second rib 12 extend along the gravity direction in a state where the air conditioner 1 is mounted on a vehicle. In FIG. 3, the gravity direction is indicated by G. Specifically, the first rib 11 and the second rib 12 may extend parallel to the gravity direction or extend obliquely with respect to the gravity direction.

The first rib 11 and the second rib 12 are distanced from each other to form a stagnation space 22 between the first rib 11 and the second rib 12. The air flowing through the air passage 13 stagnates in the stagnation space 22. The wind pressure between the first rib 11 and the second rib 12 in the stagnation space 22 is smaller than the wind pressure of the air flowing through the air passage 13. The distance between the first rib 11 and the second rib 12 is set to enable a water droplet to flow, and is appropriately set by experiments or the like. The height of the first rib 11 and the second rib 12 protruding from the inner wall of the air passage 13 is appropriately set by experiments or the like.

Further, in the present embodiment, the third rib 23 is provided at a portion of the chamber inner wall 18 opposite to the first rib 11 through the opening 20. The third rib 23 extends along the gravity direction when the air conditioner 1 is mounted on a vehicle. The height of the third rib 23 protruding from the inner wall of the air passage 13 is set appropriately by experiments or the like.

Figure 6:
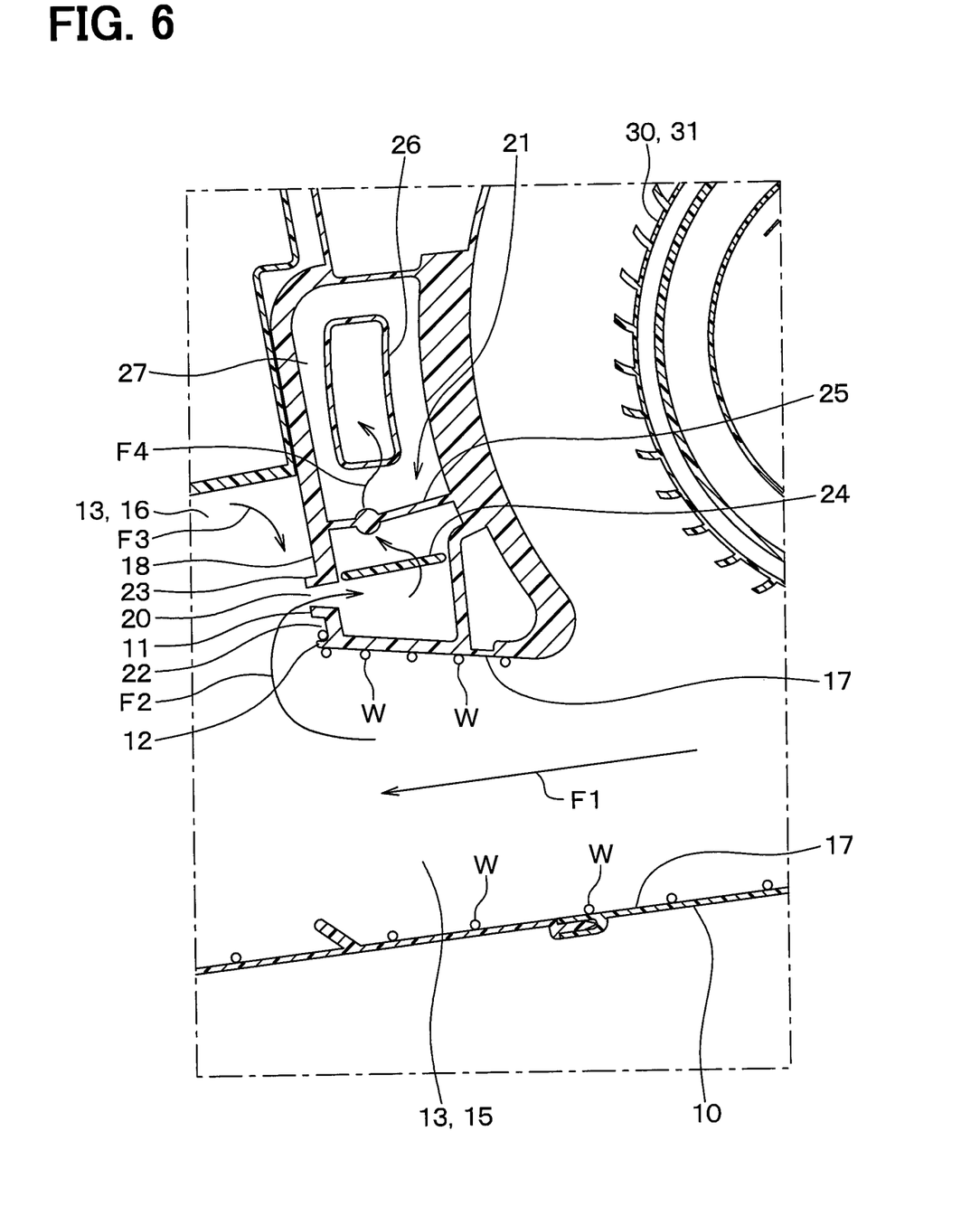
FIG. 6 is an enlarged view of an area VI in FIG. 1.

In the air conditioner 1 for a vehicle, for example, when snow accumulated on the windshield of the vehicle melts, liquid such as water may enter the air passage 13 from the outside of the vehicle through the outside air inlet 14 of the air conditioning case 10. It is conceivable that liquid such as water enters the air passage 13 also when the vehicle is washed with a wash machine while driving the blower 30 of the air conditioner 1. In such a case, the liquid that has entered from the outside air inlet 14 is made into small droplets by the fan 31 of the blower 30 and adheres to the inner wall of the air passage 13. The wind pressure causes the small droplets to travel along the inner wall of the air passage 13 toward the evaporator 40. In FIG. 6, the droplets W typically move along the inner wall of the air passage 13. When the droplet W passes over the second rib 12 and enters the stagnation space 22, the droplet W hardly receives the wind pressure of the air flowing through the air passage 13, and flows downward in the gravity direction by the self-weight. Therefore, the droplet W is prevented from entering the opening 20 while the air flowing through the air passage 13 is introduced into the opening 20, as shown by an arrow F2 in FIG. 6. The liquid which has fallen to the bottom of the air conditioning case 10 is discharged from the drainage hole 19 (see FIG. 2) provided in the bottom of the air conditioning case 10.

Figure 4:
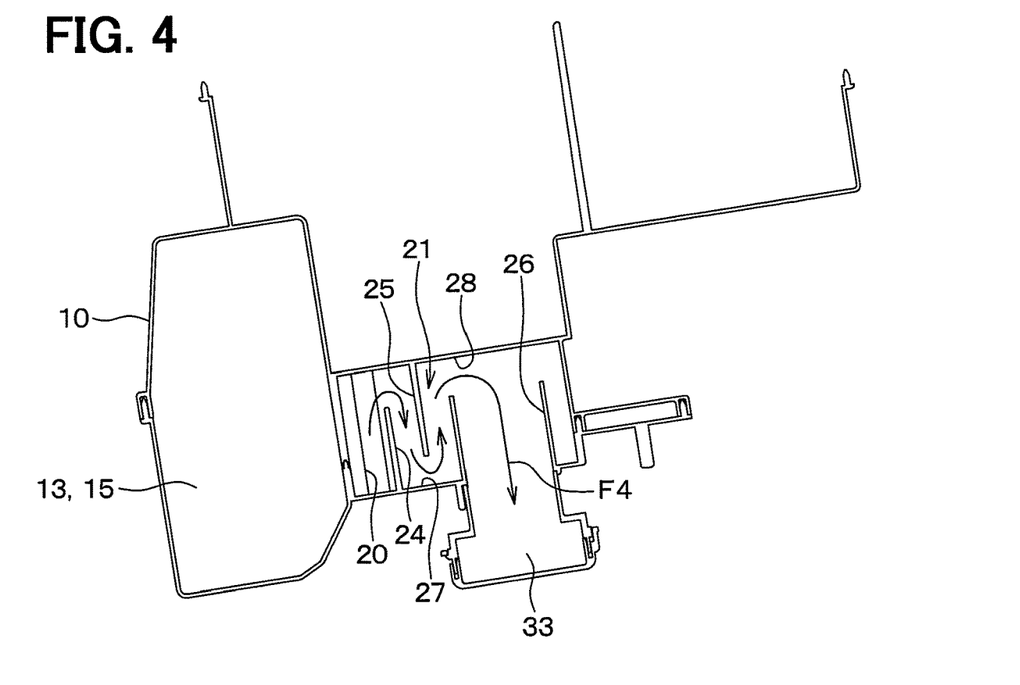
FIG. 4 is a sectional view taken along a line IV-IV in FIG. 1.

As indicated by an arrow F3 in FIG. 6, the air may wind along the chamber inner wall 18 in the chamber 16. In this case, the third rib 23 prevents the liquid from entering the opening 20 while the air is blown into the opening 20 from the side opposite to the first rib 11. The opening 20 provided in the inner wall of the air passage 13 is in communication with the cooling air introduction portion 21 inside of the air conditioning case 10. As shown in FIG. 4 and FIG. 6, the cooling air introduction portion 21 has a first wall 24 and a second wall 25 for forming a labyrinth flow path. Further, the cooling air introduction portion 21 has a cylindrical portion 26 for guiding the air to a cooling passage 33 described later. The first wall 24 extends upward from the bottom wall 27 of the cooling air introduction portion 21. The second wall 25 extends downward from the top wall 28 of the cooling air introduction portion 21. The cylindrical portion 26 extends upward from the bottom wall 27 of the cooling air introduction portion 21. Therefore, as indicated by an arrow F4 in FIG. 4 and FIG. 6, the air flowing through the cooling air introduction portion 21 flows in the labyrinth flow path formed by the first wall 24, the second wall 25 and the cylindrical portion 26. Therefore, even if the liquid gets over the first rib 11 or the third rib 23 and enters the cooling air introduction portion 21 from the opening 20, the labyrinth flow path prevents the liquid from passing through the first wall 24, the second wall 25 and the cylindrical portion 26. In the present embodiment, since the first rib 11 and the second rib 12 prevent the liquid from entering the cooling air introduction portion 21 from the opening 20, the first wall 24, the second wall 25 and the cylindrical portion 26 can be omitted.

As shown in FIG. 1, the blower 30, the evaporator 40, and the heater core 50 are provided inside the air conditioning case 10.

Figure 5:
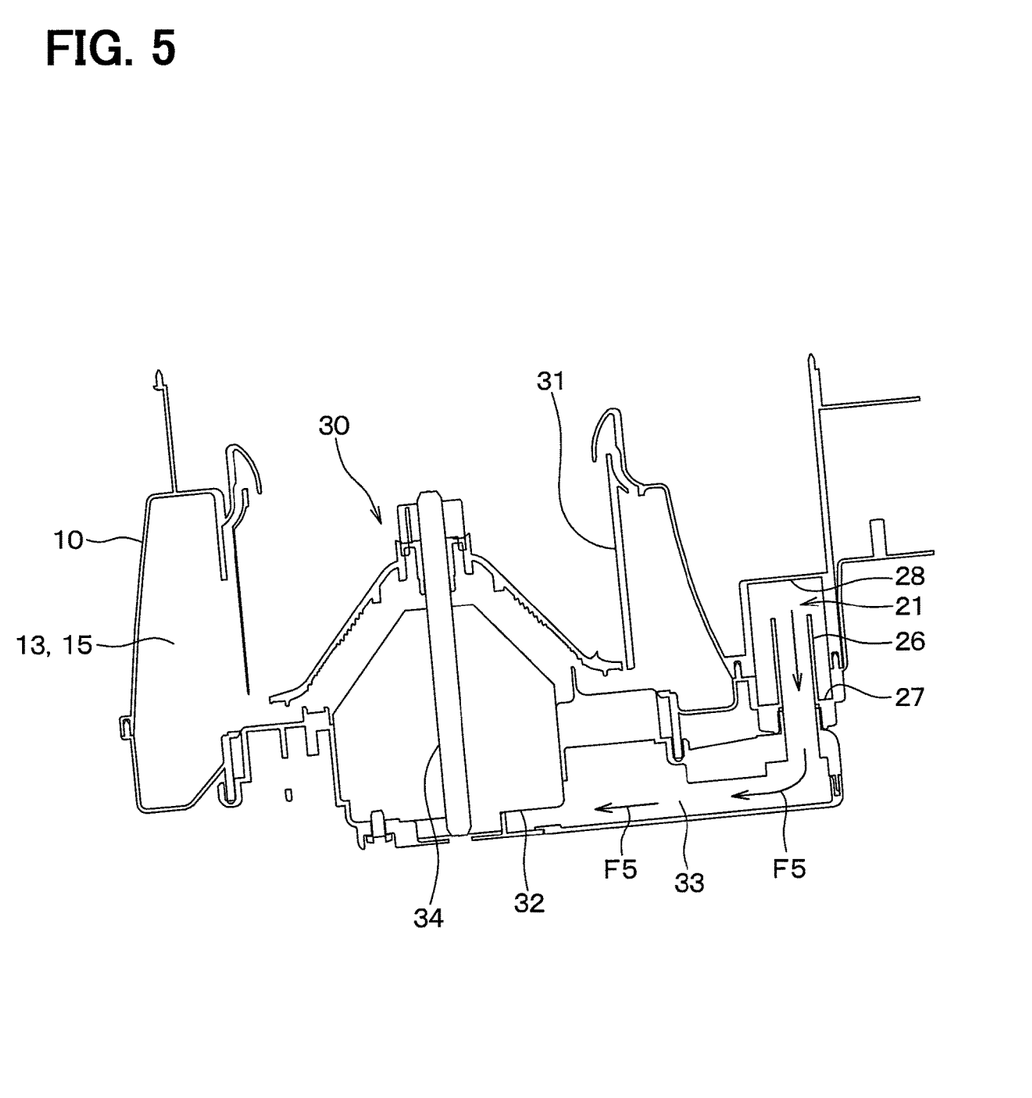
FIG. 5 is a sectional view taken along a line V-V in FIG. 1.

As shown in FIG. 5, the blower 30 has a fan 31, a motor 32 for rotating the fan 31, and a cooling passage 33 for cooling the motor 32. The fan 31 is a centrifugal fan provided inside the air conditioning case 10. When the motor 32 is energized, the shaft 34 of the motor 32 rotates about its axis. Thereby, the fan 31 fixed to the shaft 34 is rotated. When the fan 31 rotates, an air flow is generated in the air passage 13, and the outside air or the inside air is introduced into the air passage 13 from the outside air inlet 14 or the inside air inlet.

The cooling passage 33 has one open end connected to the cooling air introduction portion 21 inside the air conditioning case 10, and the other open end connected to the motor 32. Therefore, as shown by an arrow F5 in FIG. 5, the air flowing into the cooling passage 33 from the cooling air introduction portion 21 is blown to the motor 32 through the cooling passage 33. As a result, the motor 32 can be cooled.

The evaporator 40 shown in FIGS. 1 and 2 is a heat exchanger for cooling the air flowing through the air passage 13. The evaporator forms a refrigeration cycle together with a compressor, a condenser, an expansion valve and the like which are not shown. The evaporator 40 is disposed downstream of the expansion valve and upstream of the compressor in the refrigeration cycle. The evaporator includes tubes (not shown) in which refrigerant flows after decompressed by the expansion valve to be in a gas-liquid two-layer state. The evaporator 40 cools the air flowing through the air passage 13 by heat exchange between the refrigerant flowing inside the tubes and the air flowing through the air passage 13.

The heater core 50 is a heat exchanger for heating the air flowing through the air passage 13. Hot water flows inside the tube (not shown) of the heater core 50. The heater core 50 heats the air flowing through the air passage 13 by heat exchange between the hot water flowing inside the tube and the air flowing through the air passage 13.

An air mixing door (not shown) is provided between the evaporator 40 and the heater core 50. The air mix door adjusts the ratio of the amount of air bypassing the heater core 50 and the amount of air passing through the heater core 50 after passing through the evaporator 40.

The air conditioning case 10 has plural blowout openings (not shown) downstream of the heater core 50 in the air flow direction of the air passage 13, for blowing air into the vehicle cabin. A duct (not shown) configured as a separate member from the air conditioning case 10 may be connected to the plural blowout openings. After the temperature and the humidity are adjusted by the evaporator 40 and the heater core 50, the air flowing through the air passage 13 is blown into the vehicle cabin via at least one of the plural blowout openings communicating with the air passage 13.

The air conditioner 1 of the present embodiment exhibits the following effects.

In the present embodiment, the first rib 11 is provided in a portion of the inner wall forming the air passage 13 adjacent to the opening 20, at the upstream side in the air flow direction. The second rib 12 is provided in a portion of the inner wall forming the air passage 13 at the upstream side of the first rib 11 in the air flow direction. The stagnation space 22 is formed between the first rib 11 and the second rib 12, in which the air flowing through the air passage 13 stagnates.

Accordingly, when liquid such as water enters the air passage 13 from the outside of the vehicle through the outside air inlet 14 and travels along the inner wall of the air passage 13 by the wind pressure toward the opening 20, the liquid gets over the second rib 12 and enter the stagnation space 22. Then, the liquid hardly receives the wind pressure of the air flowing through the air passage 13 and flows downward in the gravity direction by the self-weight in the stagnation space 22. Therefore, in the air conditioner 1, the liquid can be restricted from entering the opening 20 defined in the air passage 13 of the air conditioning case 10.

Further, since the entry of the liquid into the cooling passage 33 can be suppressed in the air conditioner 1, it is not necessary to provide a discharge port in the cooling passage 33 for discharging the liquid. Therefore, the ability to cool the motor 32 can be enhanced since the air flowing through the cooling passage 33 is not blown out from the discharge port.

In a comparison example, if one rib is provided on the inner wall of the air passage 13 and the height of the rib projecting from the inner wall of the air passage 13 is increased, it is possible to form a stagnation space on a downstream side of the one rib in the air flow direction. However, if the one rib is made higher, the resistance of the air flowing through the air passage 13 of the air conditioning case 10 becomes larger. In contrast, according to the first embodiment, since the stagnation space 22 is formed between the first rib 11 and the second rib 12, it is possible to lower the height of the first rib 11 and the second rib 12 protruding from the inner wall of the air passage 13. Therefore, the resistance of the air flowing through the air passage 13 of the air conditioning case 10 can be reduced in the air conditioner 1.

In the present embodiment, the first rib 11 and the second rib 12 extend along the gravity direction in a state where the air conditioner 1 is mounted on a vehicle.

Accordingly, the first rib 11 and the second rib 12 enable the droplet in the stagnation space 22 to flow downward in the gravity direction by the own weight. Therefore, the droplet can be restricted from entering the opening 20 in the air passage 13 of the air conditioner 1.

In the present embodiment, the opening 20 is provided in the chamber inner wall 18.

The wind pressure of the air flowing through the chamber 16 of the air conditioning case 10 is smaller than the wind pressure of the air flowing through the main air passage 15. Therefore, in the air conditioner 1, the entry of the liquid into the opening 20 can be more reliably suppressed by providing the opening 20 in the chamber inner wall 18 forming the chamber 16.

In the present embodiment, the opening 20, the first rib 11 and the second rib 12 are provided on the chamber inner wall 18.

Since the wind pressure of the air flowing through the chamber 16 of the air conditioning case 10 is smaller than the wind pressure of the air flowing through the main air passage 15, the wind pressure in the stagnation space 22 can be further reduced by providing the first rib 11 and the second rib 12 on the chamber inner wall 18 forming the chamber 16. Therefore, in the air conditioner 1, the liquid entering the stagnation space 22 can be reliably made to flow downward in the gravity direction by its own weight.

In the present embodiment, the air conditioner 1 further includes the third rib 23 provided on a portion of the chamber inner wall 18 opposite to the first rib 11 across the opening 20.

Thereby, it is possible to prevent the liquid from entering the opening 20 together with the air blown into the opening 20 from the side opposite to the first rib 11.

Second Embodiment

A second embodiment will be described, in which the third rib 23 is omitted compared with the first embodiment. Since the other configuration is the same as the first embodiment, only a different part from the first embodiment is described.

Figure 7:
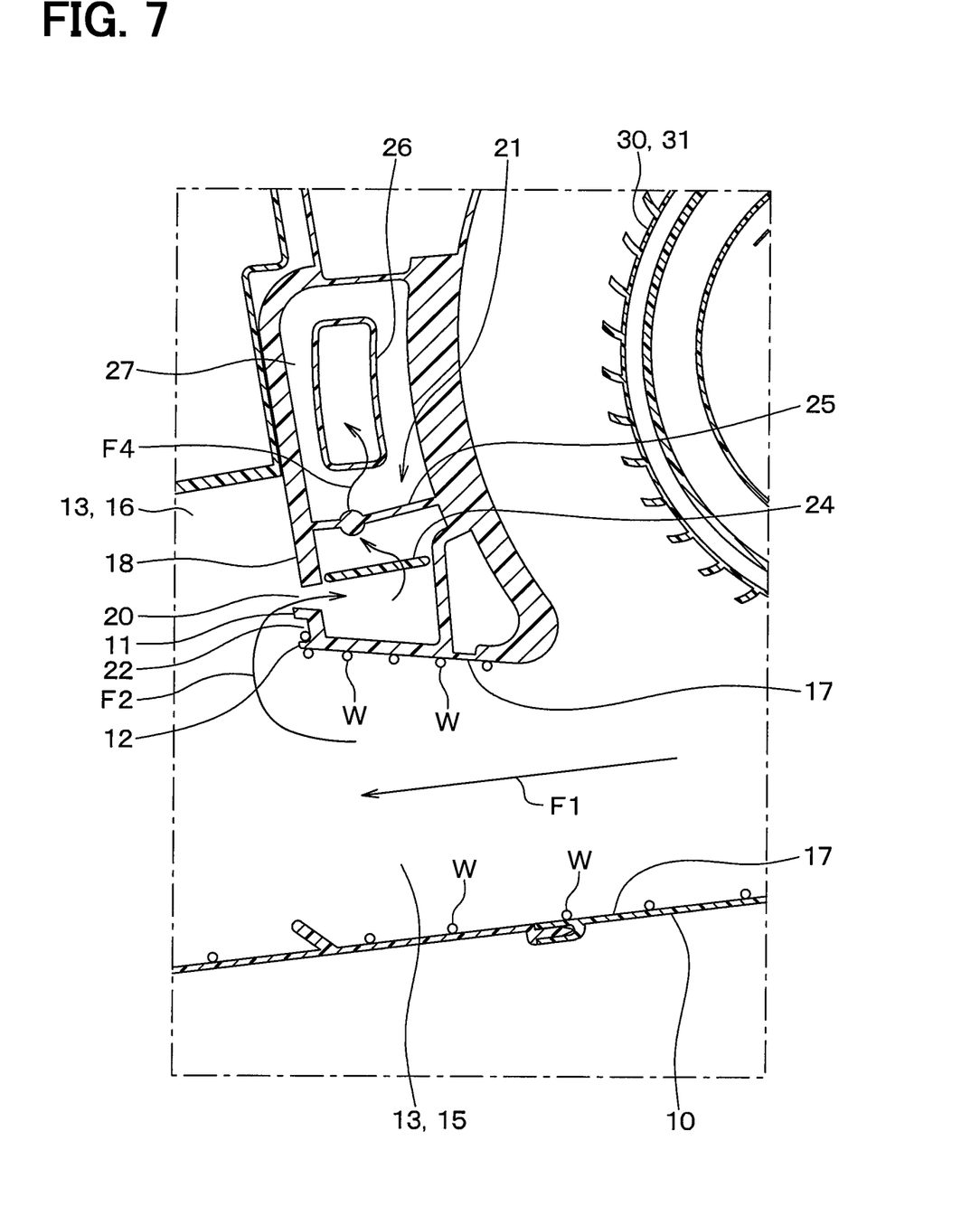
FIG. 7 is an enlarged view of an air conditioner according to a second embodiment.

As shown in FIG. 7, in the second embodiment, the air conditioner 1 does not include the third rib 23. In the second embodiment, the third rib 23 can be eliminated when liquid hardly enters the opening 20 from the side opposite to the first rib 11. The second embodiment can also achieve the same effects as those of the first embodiment.

Third Embodiment

A third embodiment will be described, in which the first rib 11 and the second rib 12 are modified compared with the second embodiment. Since the other configuration is the same as the second embodiment, only a different part from the second embodiment is described.

Figure 8:
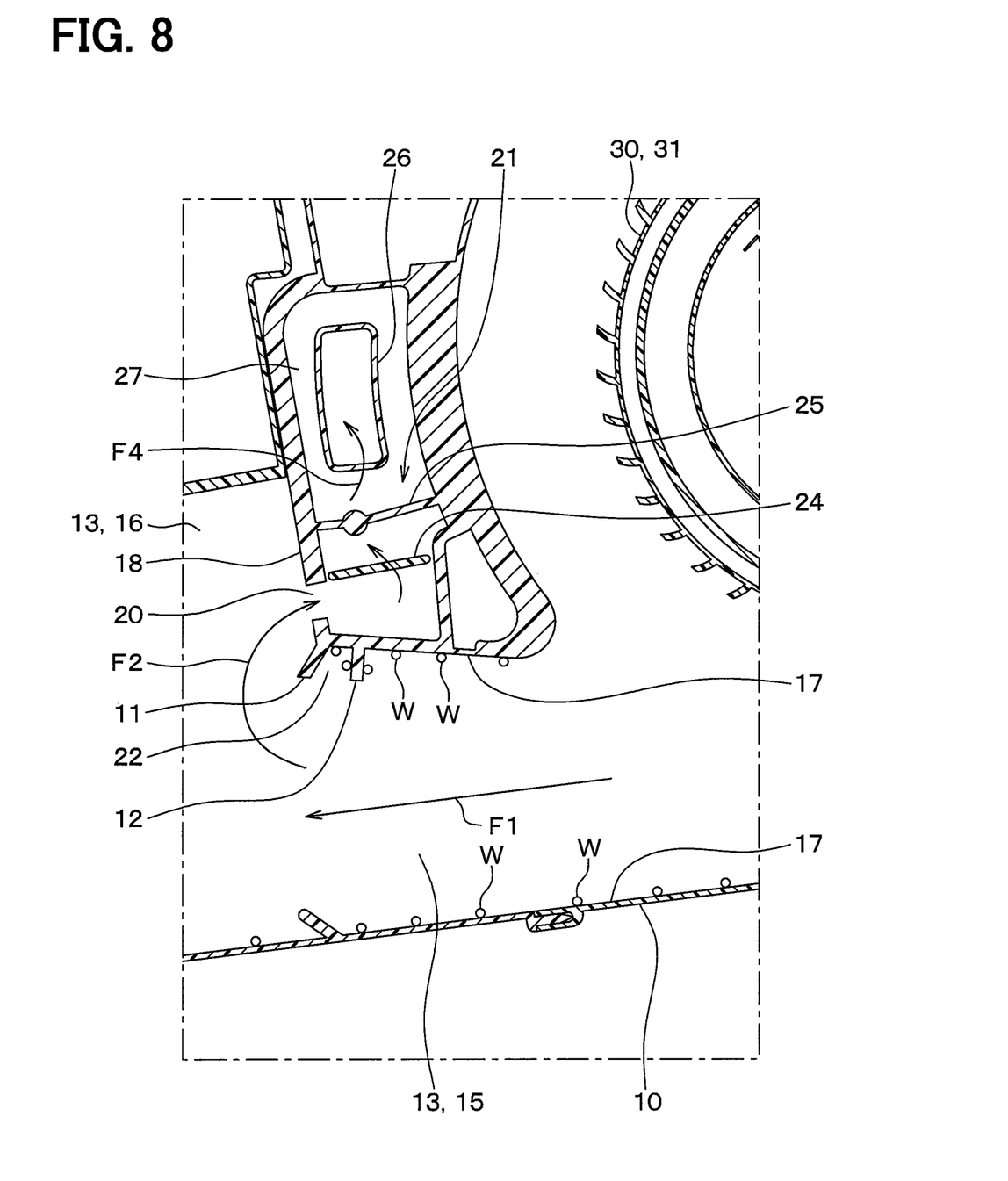
FIG. 8 is an enlarged view of an air conditioner according to a third embodiment.

As shown in FIG. 8, in the third embodiment, the first rib 11 and the second rib 12 are provided on the main inner wall 17 forming the main air passage 15, among the inner walls of the air passage 13. Also in the third embodiment, the first rib 11 is provided in a portion of the inner wall forming the air passage 13 at the upstream side of the opening 20 in the air flow direction. The second rib 12 is provided in a portion of the inner wall forming the air passage 13 at the upstream side of the first rib 11 in the air flow direction. A stagnation space 22 is formed between the first rib 11 and the second rib 12, in which the air flowing through the air passage 13 stagnates.

Furthermore, in the third embodiment, the first rib 11 is inclined to the downstream side in the air flow direction as extending from the inner wall of the air passage 13 toward the central portion of the air passage 13. Thereby, it is possible to suppress the resistance of the air flowing through the air passage 13 from increasing even when the first rib 11 is provided.

The second rib 12 may be inclined to the downstream side in the air flow direction as extending from the inner wall of the air passage 13 toward the central portion of the air passage 13.

The same effects can be obtained in the third embodiment as the first and second embodiments.

Fourth Embodiment

A fourth embodiment will be described, in which the opening 20 is modified with respect to the third embodiment. The other parts are the same as the third embodiment, so only the parts different from the third embodiment will be described.

Figure 9:
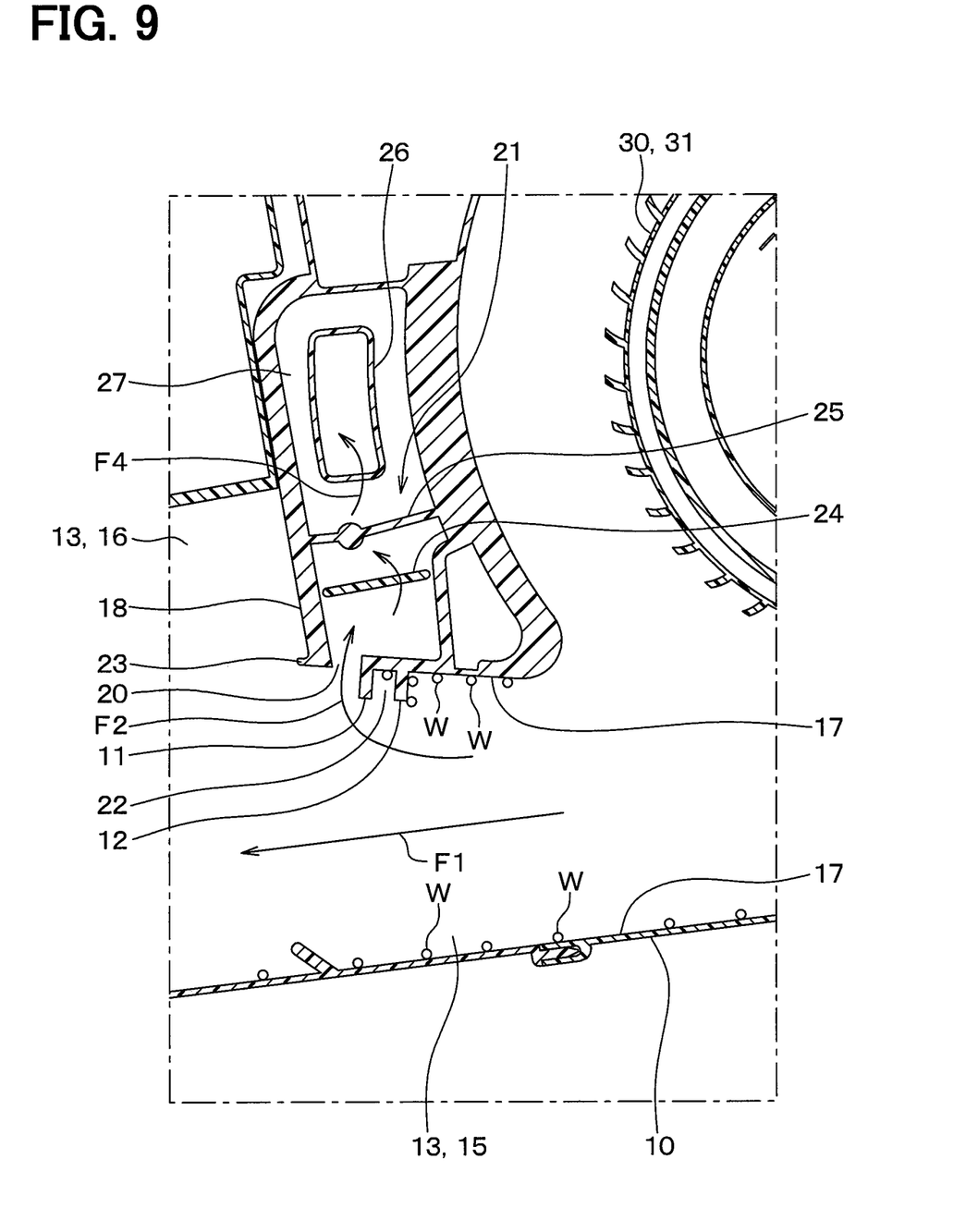
FIG. 9 is an enlarged view of an air conditioner according to a fourth embodiment.

As shown in FIG. 9, in the fourth embodiment, the opening 20 is defined in the main inner wall 17 forming the main air passage 15, among the inner walls of the air passage 13. Also in the fourth embodiment, the first rib 11 is provided in a portion of the inner wall forming the air passage 13 on the upstream side of the opening 20 in the air flow direction. The second rib 12 is provided in a portion of the inner wall forming the air passage 13 on the upstream side of the first rib 11 in the air flow direction. A stagnation space 22 is formed between the first rib 11 and the second rib 12, in which the air flowing through the air passage 13 stagnates.

In the fourth embodiment, the first rib 11 and the second rib 12 are formed perpendicularly to the main inner wall 17. Even in this case, since the heights of the first rib 11 and the second rib 12 projecting from the main inner wall 17 are low, the resistance of the air flowing through the air passage 13 is extremely small. The same effects can be obtained in the fourth embodiment as the first to third embodiments described above.

Fifth Embodiment

A fifth embodiment will be described, in which the first rib 11 and the second rib 12 are modified with respect to the first and second embodiments. The other parts are the same as the first and second embodiments. Only the parts different from the first and second embodiments will be described.

Figure 10:
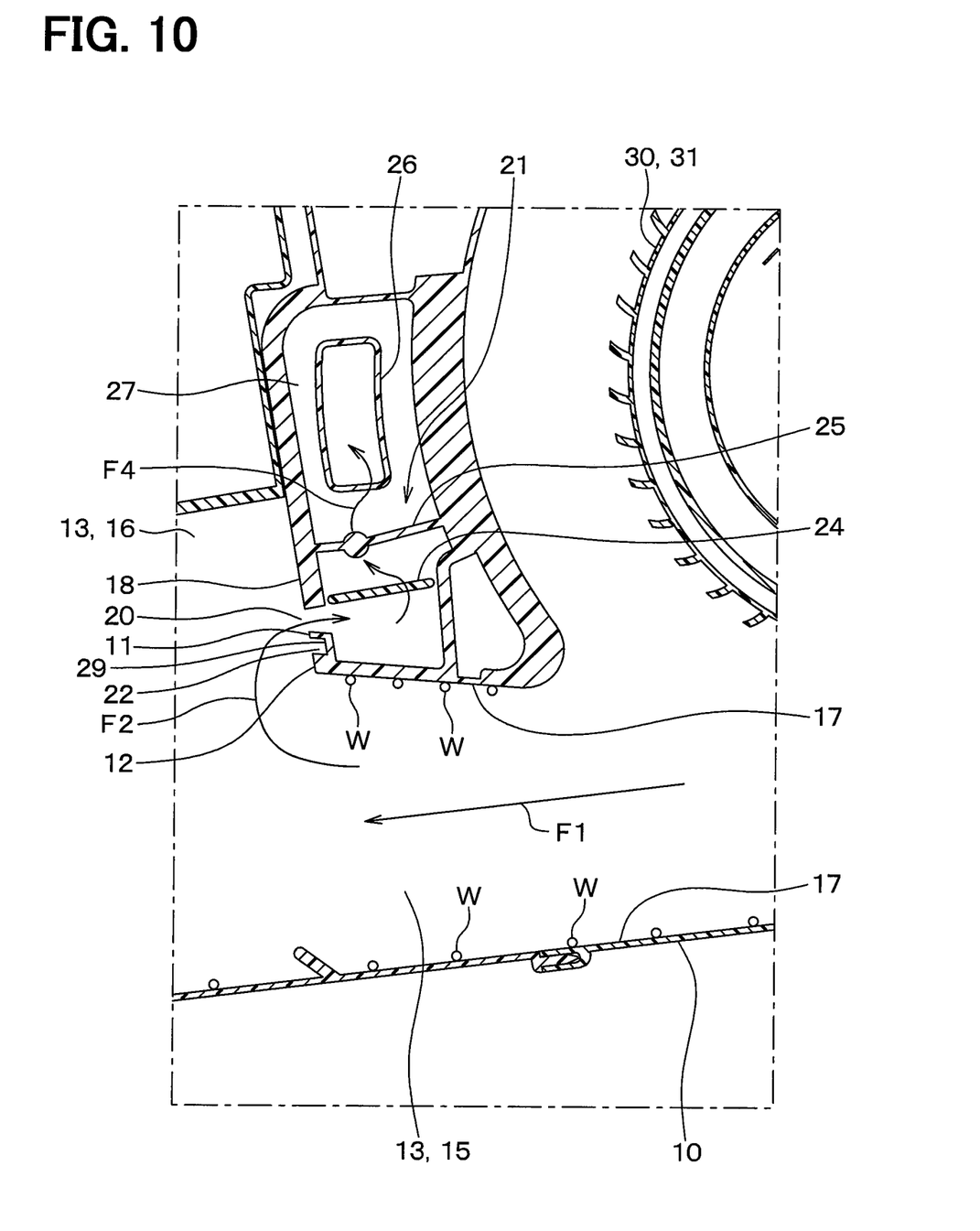
FIG. 10 is an enlarged view of an air conditioner according to a fifth embodiment.

As shown in FIG. 10, in the fifth embodiment, the tip end of the first rib 11 and the tip end of the second rib 12 are substantially flush with the chamber inner wall 18 forming the chamber 16 of the air passage 13. That is, in the fifth embodiment, a stagnation space 22 is formed by a recess 29 recessed from the surface of the chamber inner wall 18 in the thickness direction of the chamber inner wall 18. The stagnation space 22 is formed inside the recess 29. The recess 29 extends along the gravity direction when the air conditioner 1 is mounted on a vehicle. Specifically, the recess 29 may extend obliquely with respect to the gravity direction, or may extend parallel to the gravity direction.

In the fifth embodiment, the first rib 11 is defined by a part of the chamber inner wall 18 of the air passage 13 located between the recess 29 and the opening 20. Further, the second rib 12 is defined by a part of the chamber inner wall 18 of the air passage 13 located opposite from the opening 20 through the recess 29.

Also in the fifth embodiment, the liquid in the stagnation space 22 hardly receives the wind pressure of the air flowing in the air passage 13 and flows downward in the gravity direction due to its own weight. Therefore, the same effects can be obtained in the fifth embodiment as the first to fourth embodiments.

OTHER EMBODIMENTS

The present disclosure is not limited to the embodiments described above, and can be modified as appropriate. The above embodiments are not independent of each other, and can be appropriately combined except when the combination is obviously impossible. In each of the above embodiments, it is needless to say that the elements configuring the embodiment are not necessarily indispensable except when it is clearly indicated that the elements are particularly indispensable, when the elements are clearly considered to be indispensable in principle, and the like. Further, in each of the above embodiments, when numerical values such as the number, numerical value, quantity, range, and the like of the components of the embodiment are referred to, except in the case where the numerical value is expressly indispensable in particular, the case where the numerical value is obviously limited to a specific number in principle, and the like, the present disclosure is not limited to the specific number. Further, in each of the above-mentioned embodiments, when referring to the shape, positional relationship, and the like of a component and the like, the component is not limited to the shape, positional relationship, and the like, except for the case where the component is specifically specified, the case where the component is fundamentally limited to a specific shape, positional relationship, and the like.

In the above embodiments, the air passage 13 of the air conditioning case 10 has the main air passage 15 and the chamber 16. In another embodiment, the air passage 13 of the air conditioning case 10 may not have the chamber 16. In this case, the opening 20, the first rib 11, and the second rib 12 are provided on the main inner wall 17.

In the above embodiments, the cooling air introduction portion 21 has the first wall 24, the second wall 25, and the cylindrical portion 26 to form the labyrinth flow path. In another embodiment, the cooling air introduction portion 21, the first wall 24, the second wall 25 and the cylindrical portion 26 may be eliminated.

In the fifth embodiment, the recess 29, the first rib 11, the second rib 12, the stagnation space 22, the opening 20 and the like are provided on the chamber inner wall 18 forming the chamber 16, of the inner wall of the air passage 13. In another embodiment, the recess 29, the first rib 11, the second rib 12, the stagnation space 22, the opening 20 and the like may be formed on the main inner wall 17 forming the main air passage 15, of the inner wall of the air passage 13.

According to an aspect of the present disclosure represented by a part or all of the above embodiments, an air conditioner includes an air conditioning case, a fan, a motor, a cooling passage, a first rib and a second rib. The air conditioning case has an air passage through which outside air or inside air flows after introduced from an outside air inlet or an inside air inlet. The fan generates an air flow in the air conditioning case. The motor rotates the fan. The cooling passage supplies air to the motor from an opening provided in the air passage. The first rib is provided on a part of the inner wall forming the air passage on a side closer to the outside air inlet than the opening in the air flow direction. The second rib is provided on a part of the inner wall forming the air passage on the side closer to the outside air inlet than the first rib in the air flow direction. A stagnation space is formed between the first rib and the second rib, in which the air flowing in the air passage stagnates.

In a comparison example, a blower used for an air conditioner includes a fan, a motor that rotates the fan, and a cooling passage that supplies cooling air to the motor. An end of the cooling passage opposite to the motor is connected to an opening provided in the air conditioning case. In the comparison example, a part of the air flowing through the air passage of the air conditioning case is supplied to the motor from the opening through the cooling passage, such that the motor is cooled. However, when snow accumulated on the windshield of the vehicle melts, or when the vehicle is washed with water while the blower of the air conditioner is driven, water may enter the air passage and may reach the motor of the blower through the cooling passage. In this case, the motor may be damaged. In the comparison example, a discharge port for discharging the water may be provided in the cooling passage of the blower. However, when the discharge port is provided in the cooling passage, a part of the air flowing through the cooling passage is blown out from the discharge port. As a result, the ability to cool the motor may be lowered.

The present disclosure provides an air conditioner capable of suppressing liquid from entering the cooling passage from the air passage inside the air conditioning case.

According to the present disclosure, when a liquid such as water enters the air passage from the outside of the vehicle through the outside air inlet of the air conditioning case, the liquid is made into small droplets by the fan and adheres on the inner wall of the air passage. Due to the wind pressure, the liquid moves along the inner wall of the air passage toward an outlet side of the air conditioning case. When the droplet gets over the second rib and enters the stagnation space formed between the second rib and the first rib, the droplet hardly receives the wind pressure of the air flowing through the air passage, and flows downward in the gravity direction by its own weight in the stagnation space. Therefore, according to the present disclosure, the liquid can be suppressed from entering the cooling passage from the opening provided in the air passage of the air conditioning case.

Further, according to the present disclosure, since the entry of the liquid into the cooling passage is suppressed, it is not necessary to provide a discharge port in the cooling passage for discharging the liquid. Therefore, the ability to cool the motor can be enhanced because the air flowing through the cooling passage is not blown out from the discharge port.

The first rib and the second rib may extend along the gravity direction in the state where the air conditioner is mounted on a vehicle. At least one of the first rib and the second rib may be inclined to the downstream side in the flow direction of air as extending from the inner wall of the air passage toward a central portion of the air passage. Therefore, it is possible to reduce the resistance of the air flowing through the air passage.

The air conditioner may further include an evaporator and a heater core provided in the air passage of the air conditioning case. The inner wall forming the air passage of the air conditioning case has a main inner wall forming the main air passage through which the air flows from the outside air inlet or from the inside air inlet toward the evaporator, and a chamber inner wall forming a chamber provided on a side of the main air passage in a direction intersecting with the flow direction of air. The opening may be provided in the chamber inner wall.

The wind pressure of the air flowing through the chamber of the air conditioning case is smaller than the wind pressure of the air flowing through the main air passage. Therefore, the liquid can more reliably be suppressed from entering the opening by providing the opening in the chamber inner wall forming the chamber.

The first rib and the second rib may be provided on the chamber inner wall. Since the wind pressure of the air flowing through the chamber of the air conditioning case is smaller than the wind pressure of the air flowing through the main air passage, the wind pressure in the stagnation space can be lowered by providing the first rib and the second rib on the chamber inner wall. Therefore, the liquid in the stagnation space can reliably be made to flow downward in the gravity direction by its own weight.

The opening may be provided on the main inner wall. The first rib and the second rib may be provided on the main inner wall. The air conditioner may further include a third rib provided on a portion of the chamber inner wall opposite to the first rib through the opening, so that the liquid can be prevented from entering the opening with the air blown into the opening from the opposite side to the first rib.

What is claimed is:

1. An air conditioner for a vehicle comprising:
   an air conditioning case including an air passage through which air flows;
   a fan configured to produce an air flow in the air conditioning case;
   a motor configured to rotate the fan;
   a cooling passage to supply air to the motor from an opening defined in the air passage;
   a first rib disposed on an inner wall of the air passage and located upstream of the opening in a flow direction of air; and
   a second rib disposed on the inner wall of the air passage and located upstream of the first rib in the flow direction of air, wherein
   a stagnation space is defined between the first rib and the second rib where the air flowing through the air passage stagnates,
   the inner wall of the air conditioning case that defines the air passage has:
      a main inner wall forming a main air passage through which air flows toward an evaporator from an outside air inlet or an inside air inlet; and
      a chamber inner wall forming a chamber and extending in a direction intersecting a flow of the air toward the evaporator from the outside air inlet or the inside air inlet, and
   the opening and the stagnation space are provided at a corner portion where the main inner wall and the chamber inner wall intersect with each other.

2. The air conditioner according to claim 1, wherein the first rib and the second rib extend along a gravity direction in a state where the air conditioner is mounted on a vehicle.

3. The air conditioner according to claim 2, wherein
   at least one of the first rib is positioned at an angle to the main inner wall, the angle being other than a right angle, and the second rib is positioned normal to the main inner wall at a right angle to the main inner wall.

4. The air conditioner according to claim 1 further comprising:
   an evaporator and a heater core arranged in the air passage of the air conditioning case, wherein
   the opening is defined in the chamber inner wall.

5. The air conditioner according to claim 4, wherein both the first rib and the second rib are defined on the chamber inner wall.

6. The air conditioner according to claim 1 further comprising:
an evaporator and a heater core arranged in the air passage of the air conditioning case, wherein
the opening is defined in the main inner wall.

7. The air conditioner according to claim 4, wherein both the first rib and the second rib are defined on the main inner wall.

8. The air conditioner according to claim 4, further comprising: a third rib protruding from the chamber inner wall to a side opposite to the first rib through the opening.

9. The air conditioner according to claim 1, wherein
the first rib and the second rib are provided on the main inner wall to be directly exposed to the main air passage,
the first rib is provided upstream of the opening in a first air flow direction,
the second rib is provided upstream of the first rib in a second air flow direction, and
the opening is defined in the chamber inner wall.

10. The air conditioner according to claim 1, wherein
the opening is defined in the main inner wall to be directly communicated with the main air passage,
the first rib is provided upstream of the opening in the air flow direction,
the second rib is provided upstream of the first rib in the air flow direction, and
the first rib and the second rib are formed perpendicularly to the main inner wall.

11. The air conditioner according to claim 1, wherein
the opening is located on one side of the corner portion and the stagnation space is located on an other side of the corner portion.

12. The air conditioner according to claim 1, wherein
the opening is located along the chamber inner wall and the stagnation space is located along the main inner wall.

13. The air conditioner according to claim 1, wherein
the opening and the stagnation space are both located along the main inner wall.

\* \* \* \* \*